United States Patent
Lee et al.

(10) Patent No.: US 7,032,018 B2
(45) Date of Patent: Apr. 18, 2006

(54) HOME APPLIANCE NETWORKING SYSTEM AND METHOD FOR CONTROLLING THE SAME

(75) Inventors: Sang Kyun Lee, Kyungki-do (KR); Ki Tae Oh, Kyungki-do (KR); Yeon Kyoung Lee, Kyungki-do (KR); Chang Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 583 days.

(21) Appl. No.: 10/211,285

(22) Filed: Aug. 5, 2002

(65) Prior Publication Data

US 2003/0182412 A1    Sep. 25, 2003

(30) Foreign Application Priority Data

Mar. 20, 2002  (KR) ............... 2002-15040

(51) Int. Cl.
    *G06F 15/16* (2006.01)
(52) U.S. Cl. .................................. 709/223
(58) Field of Classification Search ............... 709/223, 709/202, 226, 231, 238
    See application file for complete search history.

(56) References Cited

U.S. PATENT DOCUMENTS 6,065,061 A  *  5/2000 Blahut et al. ............... 709/239
6,653,933 B1 * 11/2003 Raschke et al. ....... 340/310.01
6,693,999 B1 *  2/2004 Ito et al. ................. 379/102.03
6,850,149 B1 *  2/2005 Park .......................... 340/7.1

FOREIGN PATENT DOCUMENTS

| JP | 3-127531 | 5/1991 |
| JP | 7-231329 | 8/1995 |
| JP | 11-103309 | 4/1999 |
| JP | 2001-268087 | 9/2001 |

OTHER PUBLICATIONS

English language Abstract of JP 11-103309.
English language Abstract of JP 7-231329.
English language Abstract of JP 3-127531.
English language Abstract JP 2001-268087.

* cited by examiner

*Primary Examiner*—David Y. Eng
(74) *Attorney, Agent, or Firm*—Greenblum & Bernstein, P.L.C.

(57) ABSTRACT

A home appliance networking system and a method for controlling the same. The home appliance networking system comprises a plurality of passive home appliances for transmitting and receiving data to/from an internal network of a home networking system. The passive home appliances are controlled according to control commands received over the internal network. The home appliance networking system further comprises a plurality of active home appliances that transmit the control commands for the passive home appliances to the internal network, and a network manager that manages the internal network and controls data transmission and reception of the plurality of passive home appliances and the plurality of active home appliances.

18 Claims, 4 Drawing Sheets

| washing machine | Notify | water level | high |
|---|---|---|---|

⊢ D1 ⊢ D2 ⊢ D3 ⊢ D4 ⊣

HOME APPLIANCE NETWORKING SYSTEM AND METHOD FOR CONTROLLING THE SAME

BACKGROUND OF THE INVENTION

1. Field of the Invention

The present invention relates to a home appliance networking system and a method for controlling the same. More particularly the present invention relates to a home appliance networking system and a method for controlling the same, wherein an additional home appliance is efficiently made interoperable with an existing home networking system including a plurality of home appliances when it is connected to an internal network of the home networking system.

2. Description of the Related Art

A home networking system has recently become increasingly widely spread in which a network is constructed to transmit and receive data to/from a plurality of home appliances installed in a home or building and the plurality of home appliances are connected to the constructed network to be interoperable with one another.

Particularly, in a home appliance networking system, a user can not only recognize state (or condition) information of a specific home appliance from any place inside of a home, but can also control the specific home appliance using a control system, such as a computer, from any place outside of the home. In this regard, the home appliance networking system has obtained favorable responses from many consumers, and has thus become more widespread in its application on an almost daily basis.

Recently, in order to construct the home appliance networking system as mentioned above, an internal network composed of a power line or local area network (LAN) line is constructed in a home or building and a plurality of home appliances are connected to the constructed internal network to transmit and receive data to/from one another.

The plurality of home appliances connected to the internal network may generally be classified into an active type, such as an audio receiver, capable of transmitting control commands to other home appliances, and a passive type, such as a speaker, capable of being controlled according to a control command transmitted from an active home appliance.

On the other hand, a general home networking system comprises a network management system connected to the internal network for controlling transmission and reception of data over the internal network such that the plurality of home appliances can efficiently transmit and receive data over the internal network.

In the case where an additional new home appliance is connected to the existing home appliance networking system includes which the network management system, active home appliances and passive home appliances as stated above, the network management system and the active home appliances must recognize information regarding the passive home appliances. For this reason, the network management system and the active home appliances have to continuously monitor whether a new home appliance has been connected to the internal network, resulting in an increase in the amount of data unnecessarily transmitted and received over the internal network.

SUMMARY OF THE INVENTION

Therefore, the present invention has been made in view of the above problems, and it is an object of the present invention to provide a home appliance networking system and a method for controlling the same, wherein, when an additional new home appliance is connected to an internal network of a home networking system including a plurality of home appliances, it can simply and efficiently exchange information with the existing home appliances.

In accordance with one aspect of the present invention, the above and other objects can be accomplished by the provision of a home appliance networking system comprising: a network management system for controlling transmission and reception of data over an internal network constructed for a home networking system, at least one active home appliance for transmitting and receiving data to/from the internal network and sending a home appliance control command over the internal network and at least one passive home appliance for transmitting and receiving data to/from the internal network. The passive home appliance is controlled according to the control command sent from the active home appliance, the active home appliance and the network management system storing information regarding the passive home appliance.

In accordance with another aspect of the present invention, there is provided a method for controlling a home appliance networking system, comprising connecting an additional new active home appliance to an internal network of a home networking system, the new active home appliance sending a home appliance control command to the internal network, allowing network management system to set and assign an address to the new active home appliance, the network management system managing transmission and reception of data over the internal network, allowing the network management system to send information regarding a plurality of passive home appliances connected to the internal network to the new active home appliance and storing the information regarding the plurality of passive home appliances in the new active home appliance.

In accordance with a further aspect of the present invention, a method is provided for controlling a home appliance networking system, comprising connecting an additional new passive home appliance to an internal network of a home networking system, the new passive home appliance being controlled according to a control command sent over the internal network, allowing network management system to set and assign an address to the new passive home appliance, the network management system managing transmission and reception of data over the internal network, allowing the network management system to send information indicative of the fact that the new passive home appliance has been connected to at least one active home appliance capable of inputting the control command and allowing the active home appliance to recognize and store information regarding the new passive home appliance.

In accordance with yet another aspect of the present invention, there is provided a method for controlling a home appliance networking system, comprising allowing at least one passive home appliance to send information regarding its changed state to an internal network of a home networking system, the passive home appliance being controlled according to a control command sent over the internal network and allowing at least one active home appliance to update state information of the passive home appliance with the information sent, the active home appliance being capable of inputting the control command over the internal network.

BRIEF DESCRIPTION OF THE DRAWINGS

The above and other objects, features and other advantages of the resent invention will be more clearly understood from the following detailed description taken in conjunction with the accompanying drawings, in which.

DESCRIPTION OF THE PREFERRED EMBODIMENTS

Figure 1:
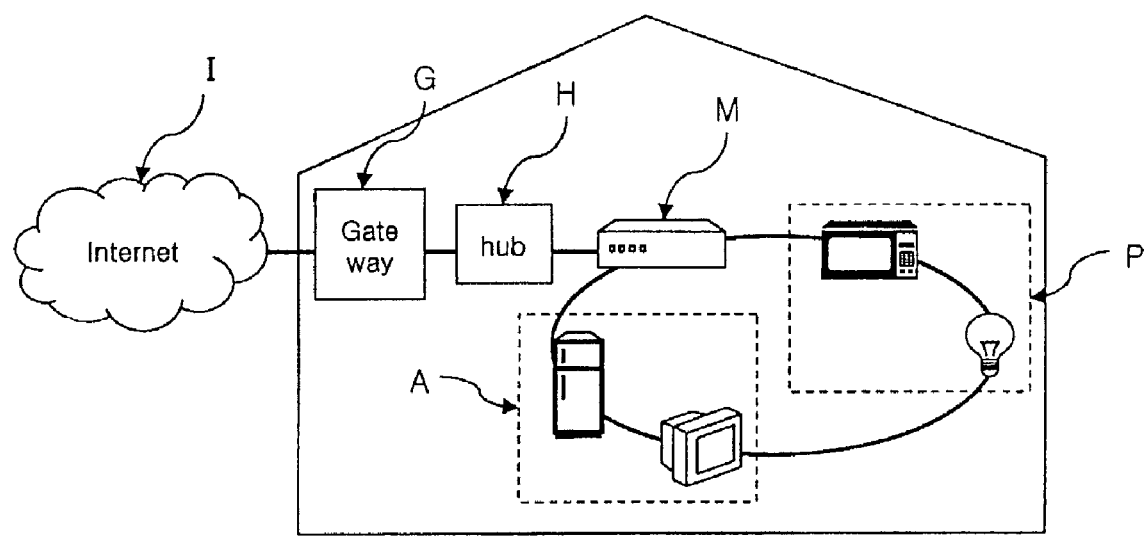
FIG. 1 is a view showing the construction of a home appliance networking system in accordance with the present invention.

FIG. 1 shows the construction of a home appliance networking system in accordance with the present invention. As shown in this drawing, the home appliance networking system comprises a plurality of passive home appliances P, such as an electric lamp, microwave oven, etc., connected to an internal network of a home networking system such that they are controlled according to control commands received over the internal network, a plurality of active home appliances A, such as a refrigerator, television, etc., connected to the internal network for transmitting the control commands for the passive home appliances P to the internal network, and a network manager M for managing the internal network and controlling data transmission and reception of the passive home appliances P and active home appliances A.

A hub H, which can be a piece of networking equipment, is connectable to the network manager M to connect the internal network to an external network of the home networking system as needed. A gateway G of the internal network is connected to the hub H such that the internal network can transmit and receive data to/from an external Internet network I.

Alternatively, the network manager M may not be an independent unit, but be implemented in a home appliance (active or passive) having a large-capacity memory, such as a refrigerator or television. In this case, the function of the network manager M is performed by such a home appliance with no necessity for separately connecting the network manager M to the internal network.

Preferably, the network manager M not only controls and manages transmission and reception of data over the internal network, but also sets and assigns an address to an additional new home appliance connected to the internal network.

Figure 2:
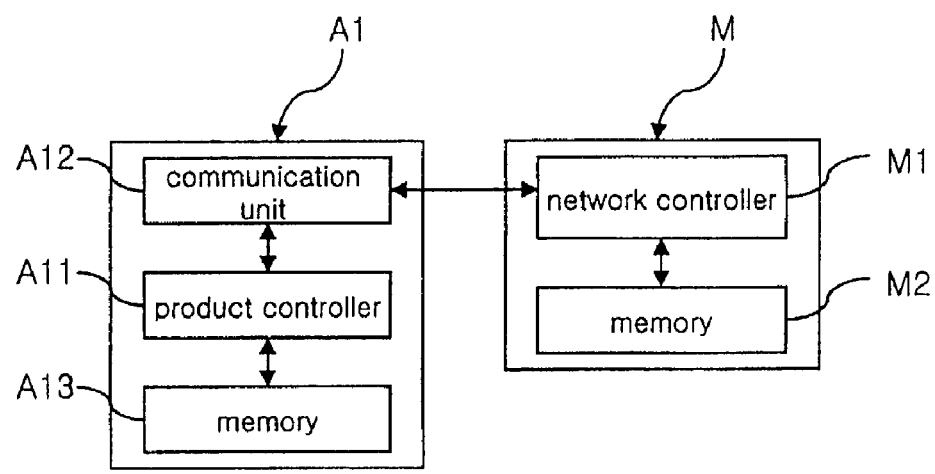
FIG. 2 is a block diagram showing an example of the case where an active home appliance is additionally provided in the construction of FIG. 1.

Namely, in the case where an additional new active home appliance A1 is connected to the internal network, as shown in FIG. 2, the network manager M sets and assigns an address to the active home appliance A1. Also, because the active home appliance A1 must be able to transmit control commands to a plurality of passive home appliances connected to the internal network, it requires information regarding the passive home appliances.

In this connection, the network manager M includes a network controller M1 for managing and controlling transmission and reception of data over the internal network, and a memory M2 for storing information regarding the plurality of passive home appliances connected to the internal network. If the active home appliance A1 transmits a data packet to the internal network after being connected to the internal network, then the network manager M analyzes the transmitted data packet, recognizes on the basis of the analyzed result that the home appliance A1 is of an active type, assigns an address to the home appliance A1 and transmits the information stored in the memory M2 to the appliance A1.

The active home appliance A1 includes a product controller A11 for controlling the entire operation of the home appliance to perform the original function of the appliance, a communication unit A12 for enabling the home appliance A1 to transmit and receive data to/from the internal network, and a memory A13 for receiving and storing the address assigned by the network manager M and the passive home appliance information transmitted from the memory M2 in the network manager M through the communication unit A12.

Preferably, the memory M2 of the network manager M stores information about types and model names of the plurality of passive home appliances connected to the internal network in the form of a map, and the active home appliance A1 connected to the internal network receives the information stored in the memory M2 after being assigned the address, stores the received information in its memory A13 and then transmits control commands respectively to the plurality of passive home appliances on the basis of the information stored in the memory A13.

If a user inputs a control command into the active home appliance A1, the product controller A11 of the home appliance A1 converts the, format of the inputted control command into a format transmittable over the internal network, and then transmits the converted control command to the internal network through the communication unit A12 on the basis of the information stored in the memory A13 of the home appliance A1. The product controller A11 also displays information regarding controllable passive home appliances on the active home appliance A1 on the basis of the information stored in the memory A13. At this time, the product controller A11 may display information regarding operating states of the passive home appliances in response to the user's request.

Figure 3:
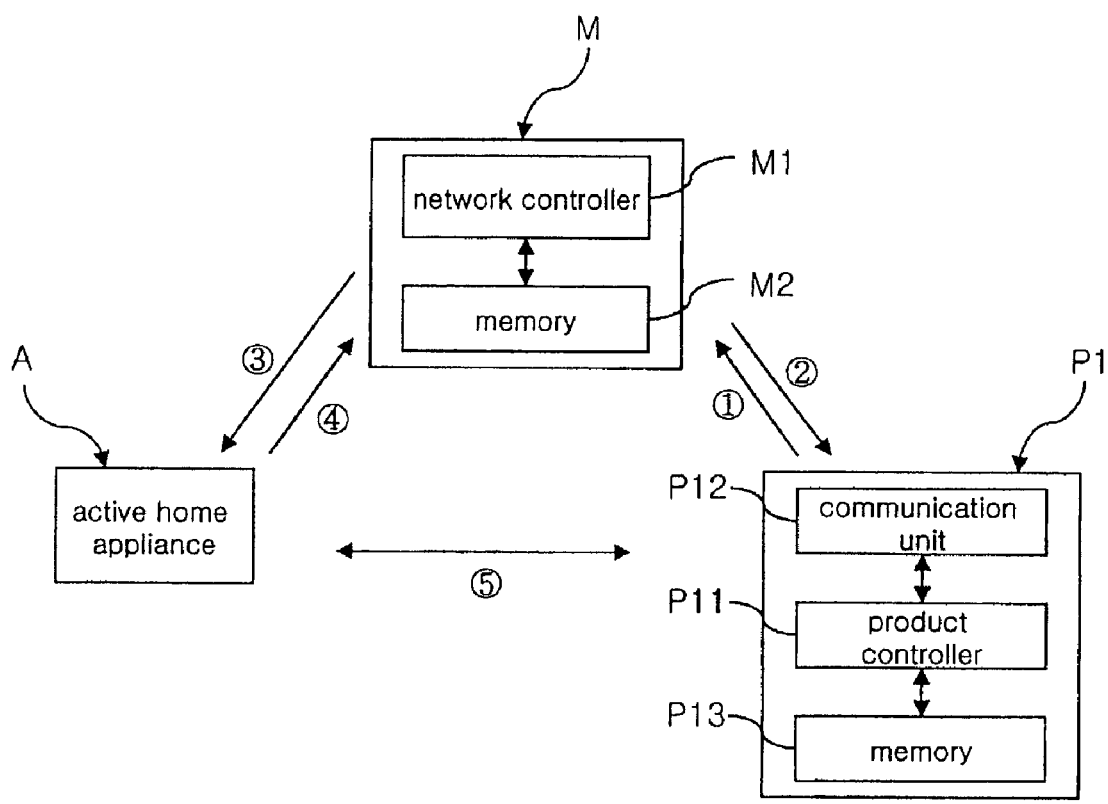
FIG. 3 is a block diagram showing an example of the case where a passive home appliance is additionally provided in the construction of FIG. 1.

FIG. 3 shows an example of the case where an additional new passive home appliance P1 is connected to the internal network of the home appliance networking system according to the present invention.

As shown in FIG. 3, if the new passive home appliance P1 is connected to the internal network according to the present invention, then it transmits and receives data to/from the network manager M. That is, the new passive home appliance P1 transmits to the internal network a data packet including information indicative of the fact that it is a passive type appliance (1) and the network manager M receives the transmitted data packet, recognizes on the basis of the received data packet that the new home appliance P1 connected to the internal network is a passive type, and then sets and assigns an address to the passive home appliance P1 (2). The network manager M also stores in its memory M2 the information indicating that the new home appliance P1 is a passive type.

The address assigned to the passive home appliance P1 is stored in a memory P13 of the home appliance P1 through a communication unit P12 of the appliance P1. The passive home appliance P1 also includes a product controller P11 for controlling the entire operation of the home appliance P1. The product controller P11 controls the passive home appliance P1 in response to a control command input through the communication unit P12.

The network manager M further sends the information indicating that the new home appliance P1 is a passive type, stored in its memory M2, to an active home appliance A (3) which then sends an acknowledgement message ACK to the network manager M upon receiving the information sent therefrom (4). Thereafter, the active home appliance A transmits and receives data directly to/from the new passive home appliance P1 to recognize and store information about a type and model name of the passive home appliance P1 (5).

As an alterative, the active home appliance A may recognize the information about the type and model name of the new passive home appliance P1 without transmitting and receiving data directly to/from the passive home appliance P1. That is, if the network manager M is set to recognize that the new home appliance P1 additionally connected to the internal network is of the passive type, recognize the information about the type and model name of the passive home appliance P1 and store the recognized information in the memory M2, it can send the information regarding the passive home appliance P1 stored in the memory M2 to the active home appliance A, thereby enabling the active home appliance A to recognize the information regarding the passive home appliance P1.

Figure 4:
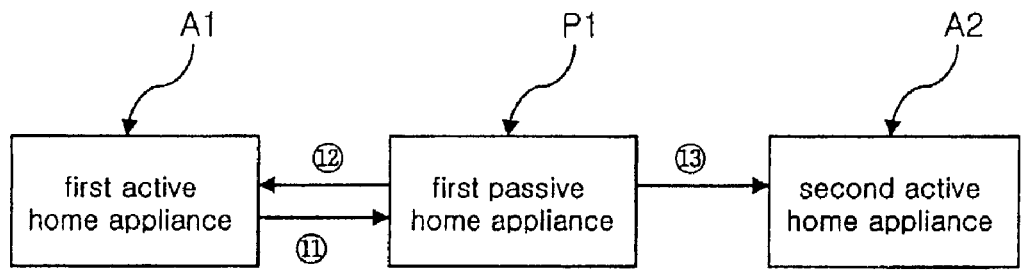
FIG. 4 is a block diagram showing an example of the case where a passive home appliance is controlled according to the construction of FIG. 1.

FIG. 4 shows an example of the case where one passive home appliance transmits information regarding its changed state to the internal network of the home appliance networking system according to the present invention.

In the home appliance networking system, generally, a plurality of active home appliances and a plurality of passive home appliances are connected to the internal network. In the case where a first active home appliance A1 transmits a control command to a first passive home appliance P1 (11) the first passive home appliance P1 is controlled according to the transmitted control command, but a second active home appliance A2 connected to the internal network cannot recognize a controlled state of the first passive home appliance P1.

For this reason, the plurality of passive home appliances P connected to the internal network transmit information regarding their controlled or changed states to the internal network. That is, the first passive home appliance P1 transmits information regarding its changed state to the first and second active home appliances A1 and A2 (12 and 13).

Figures 5, 6:
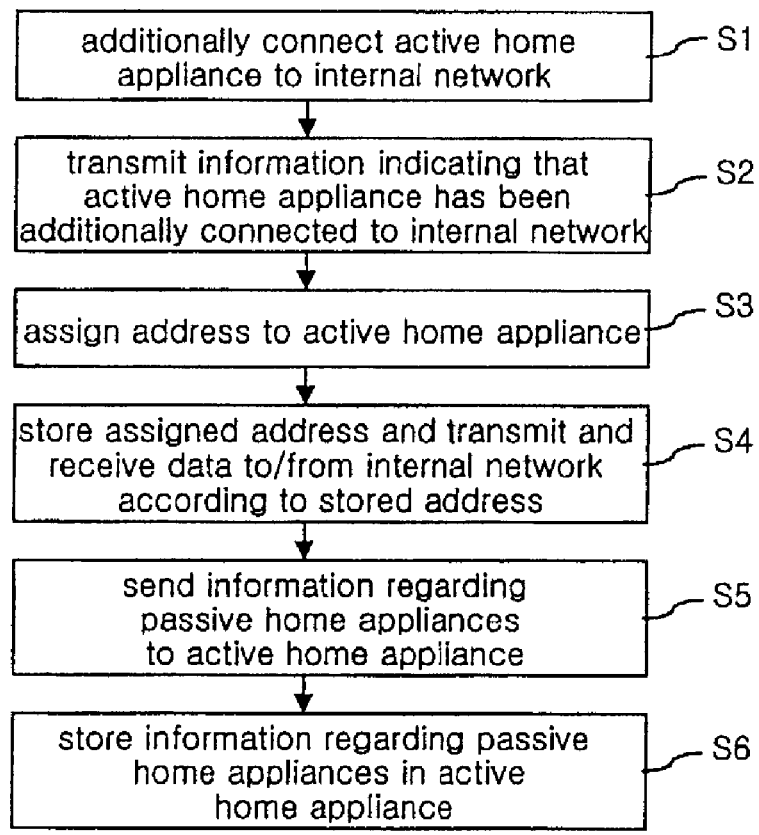
FIG. 5 is a view showing the format of a data packet transmitted from the passive home appliance in FIG. 4.
FIG. 6 is a flow chart illustrating a first embodiment of a home appliance networking system control method in accordance with the present invention.

For example, in the case where the first passive home appliance P1 is a washing machine, it transmits a data packet of a format as shown in FIG. 5. Namely, the data packet includes a source field D1 for indicating a source of the data packet, a packet type field D2 for indicating that the data packet notifies a change in state information, a state type field D3 for indicating a type of the state information, and a state change field D4 for indicating the changed state information.

In FIG. 5, with the level of water adjusted to 'high' by the first active home appliance A1, the first passive home appliance P1 transmits a data packet including information about the adjusted water level.

FIG. 6 is a flow chart illustrating a first embodiment of a home appliance networking system control method in accordance with the present invention.

First, an additional new active home appliance is connected to an internal network for a home networking system (S1).

The active home appliance connected at the above step S1 transmits to the internal network information indicative the fact that it has been additionally connected (S2).

A network manager, which manages the internal network, recognizes, on the basis of the information transmitted at the above step S2, that the active home appliance has been additionally connected, and then sets and assigns an address to the active home appliance (S3).

The active home appliance stores the address assigned at the above step S3 and transmits and receives data to/from the internal network on the basis of the stored address (S4).

The network manager sends information regarding a plurality of passive home appliances connected to the internal network, stored in its memory, to the active home appliance (S5).

The active home appliance stores the information regarding the plurality of passive home appliances transmitted at the above step S5 and displays a window for control of the passive home appliances based on the stored information such that a user can input control commands to the passive home appliances through the displayed window (S6).

Figure 7:
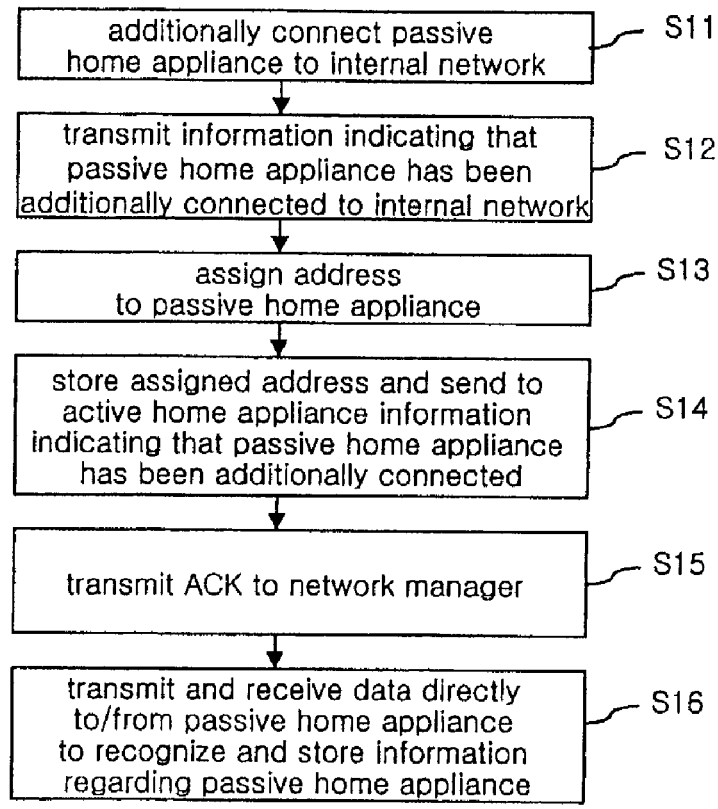
FIG. 7 is a flow chart illustrating a second embodiment of the home appliance networking system control method in accordance with the present invention.

FIG. 7 is a flow chart illustrating a second embodiment of the home appliance networking system control method in accordance with the present invention.

First, an additional new passive home appliance is connected to the internal network (S11).

The new passive home appliance transmits to the internal network information indicative of the fact that it has been additionally connected (S12).

The network manager sets and assigns an address to the passive home appliance (S13).

The passive home appliance stores the address assigned by the network manager, and the network manager sends, to at least one active home appliance connected to the internal network, the information indicative of the fact that the passive home appliance has been additionally connected (S14).

The active home appliance transmits acknowledgement information ACK to the network manager to notify the network manager that it has correctly received the information sent at the above step S14 (S15). In the case where the active home appliance transmits no ACK information, the network manager recognizes that the active home appliance has not correctly received the information sent at the above step S14, and then re-sends the same information to the active home appliance.

Thereafter, the active home appliance transmits and receives data directly to/from the new passive home appliance to recognize and store information about a type and model name of the passive home appliance (S16).

Figure 8:
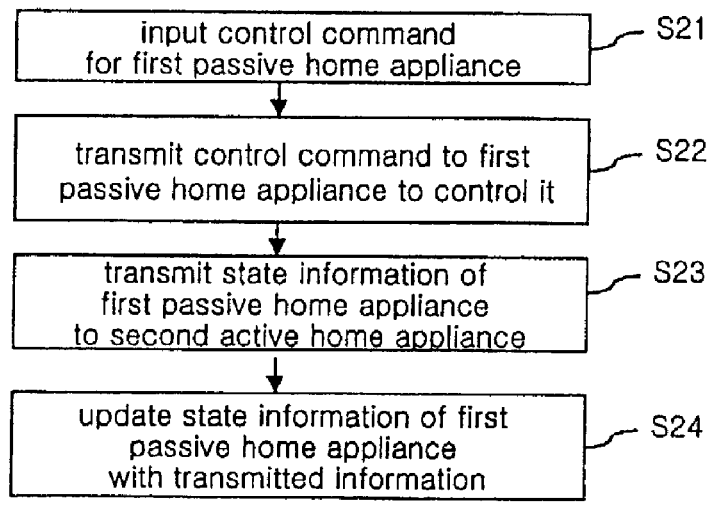
FIG. 8 is a flow chart illustrating a third embodiment of the home appliance networking system control method in accordance with the present invention.

FIG. 8 is a flow chart illustrating a third embodiment of the home appliance networking system control method in accordance with the present invention.

First, a user inputs a control command for a first passive home appliance through a first active home appliance (S21).

The first active home appliance transmits the control command to the first passive home appliance, so the first passive home appliance is controlled according to the transmitted control command (S22).

Thereafter, the first passive home appliance transmits information regarding its changed state to the internal network (S23).

A second active home appliance connected to the internal network updates the state information of the first passive home appliance with the information transmitted at the above step S23 (S24).

As apparent from the above description, the present invention provides a home appliance networking system and a method for controlling the same. The home appliance networking system comprises a plurality of passive home appliances for transmitting and receiving data to/from an internal network constructed for a home networking system. The passive home appliances are controlled according to control commands received over the internal network. The home appliance networking system further comprises a plurality of active home appliances for transmitting the control commands for the passive home appliances to the internal network, and a network manager for managing the internal network and controlling data transmission and reception of the plurality of passive home appliances and the plurality of active home appliances. The active home appliances and the network manager store information regarding the plurality of passive home appliances connected to the internal network. Therefore, when a new home appliance is additionally connected to the home appliance networking system, the active home appliances and the network manager can simply recognize the connection of the new home appliance, and the new home appliance is efficiently made interoperable with the internal network.

In the present specification "home appliance" as used is not limited to a home appliance but is used only as an example of a machine, a device or a system etc. Also, "home" as used is not limited to a home but is used as an example a home, an office, or factory, etc. Additionally, multiple buildings are included in the term "home".

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in priority Korean Application No. 2002-0015040, filed on Mar. 20, 2002, which is herein expressly incorporated by reference in its entirety.

What is claimed is:

1. A home appliance networking system comprising:
   a network management device that controls transmission and reception of data over an internal network of a home networking system;
   at least one active home appliance that transmits and receives data to/from said internal network, and sends a home appliance control command over said internal network; and
   at least one passive home appliance that transmits and receives data to/from said internal network, said passive home appliance being controlled according to said control command sent from said active home appliance;
   said active home appliance and said network management device storing information regarding said passive home appliance,
   wherein said active home appliance comprises a product controller that controls an entire operation of said active home appliance to perform original functions of said active home appliance, a communication unit that enables said active home appliance to transmit and receive data to/from said internal network, and a memory that receives and stores an address assigned by said network management device.

2. The home appliance networking system as set forth in claim 1, wherein said network management device assigns an address to a new active home appliance when the new active home appliance is connected to said internal network.

3. The home appliance networking system as set forth in claim 2, wherein said new active home appliance transmits and receives data to/from said internal network on the basis of said address assigned by said network management device.

4. The home appliance networking system as set forth in claim 2, wherein said network management device sends said information regarding said passive home appliance connected to said internal network to said new active home appliance after assigning said address thereto.

5. The home appliance networking system as set forth in claim 1, wherein said network management device assigns an address to a new passive home appliance, when the new passive home appliance is connected to said internal network.

6. The home appliance networking system as set forth in claim 5, wherein said network management device recognizes information regarding said new passive home appliance after assigning said address thereto, and sends the recognized information to said active home appliance.

7. The home appliance networking system as set forth in claim 5, wherein said network management device sends to said active home appliance information indicating that said new passive home appliance has been connected to said internal network.

8. The home appliance networking system as set forth in claim 7, wherein said active home appliance transmits and receives data directly to/from said new passive home appliance to recognize information regarding said new passive home appliance.

9. The home appliance networking system as set forth in claim 1, wherein said passive home appliance sends information regarding a change in state of said passive home appliance to said internal network.

10. The home appliance networking system as set forth in claim 9, wherein said active home appliance updates said information regarding said passive home appliance with said information regarding a change in state sent from said passive home appliance.

11. The home appliance networking system as set forth in claim 1, wherein each of said network management device and active home appliance includes a storage device that stores said information regarding said passive home appliance connected to said internal network.

12. The home appliance networking system as set forth in claim 1 further comprising:
   a hub connected to said network management device; and
   a gateway connected to both said hub and an external network of said home appliance networking system.

13. The home appliance networking system as set forth in claim 1, wherein said network management device is implemented in one of said active home appliance and said passive home appliance.

14. A method for controlling a home appliance networking system, comprising:
   connecting a new active home appliance to an internal network of a home networking system, the new active home appliance sending a home appliance control command to the internal network;

setting and assigning an address to the new active home appliance by a network management device, and managing transmission and reception of data over the internal network by the network management device;

sending, by the network management device, information regarding a plurality of passive home appliances connected to the internal network to the new active home appliance;

storing said information regarding the plurality of passive home appliances in the new active home appliance;

controlling an entire operation of said new active home appliance to perform original functions of said new active home appliance with a product controller of said new active home appliance;

transmitting and receiving data to/from said internal network from/to a communication unit of said new active home appliance; and storing an address assigned by said network management device in a memory of said new active home appliance.

15. A method for controlling a home appliance networking system, comprising:

connecting a new passive home appliance to an internal network of a home networking system, the new passive home appliance being controlled according to a control command sent over the internal network;

setting and assigning an address to the new passive home appliance by a network management device, and managing transmission and reception of data over the internal network by the network management device;

sending, by the network management device, information indicating that the new passive home appliance has been connected, to at least one active home appliance capable of inputting the control command;

the active home appliance recognizing and storing information regarding the new passive home appliance;

controlling an entire operation of said new active home appliance to perform original functions of said new active home appliance with a product controller of said new active transmitting and receiving data to/from said internal network from/to a communication unit of said new active home appliance; and storing an address assigned by said network management device in a memory of said new active home appliance.

16. The method as set forth in claim 15, recognizing and storing information sending the information regarding the new passive home appliance to the active home appliance by the network management device.

17. The method as set forth in claim 15, wherein recognizing and storing information includes transmitting and receiving, by the active home appliance, data directly to/from the new passive home appliance to recognize the information regarding the new passive home appliance.

18. A method for controlling a home appliance networking system, comprising:

sending, by at least one passive home appliance, information regarding a change in state of the at least one passive home appliance to an internal network of a home networking system, the passive home appliance being controlled according to a control command sent over the internal network;

updating, by at least one active home appliance, state information of the passive home appliance with the information sent, the active home appliance inputting the control command over the internal network;

controlling an entire operation of said new active home appliance to perform original functions of said new active home appliance with a product controller of said new active home appliance;

transmitting and receiving data to/from said internal network from/to a communication unit of said new active home appliance; and storing an address assigned by said network management device in a memory of said new active home appliance.

* * * * *

UNITED STATES PATENT AND TRADEMARK OFFICE
CERTIFICATE OF CORRECTION

| | | |
|---|---|---|
| PATENT NO. | : 7,032,018 B2 | Page 1 of 1 |
| APPLICATION NO. | : 10/211285 | |
| DATED | : April 18, 2006 | |
| INVENTOR(S) | : Sang Kyun Lee et al. | |

It is certified that error appears in the above-identified patent and that said Letters Patent is hereby corrected as shown below:

At column 9, line 39 (claim 15, line 20) of the printed patent, after "active" insert --home appliance;--.

Signed and Sealed this

Fifth Day of December, 2006

JON W. DUDAS
*Director of the United States Patent and Trademark Office*